Nov. 23, 1971     A. T. CLASSEN     3,621,503
APPARATUS FOR WASHING EGGS
Filed Sept. 12, 1969     5 Sheets-Sheet 1
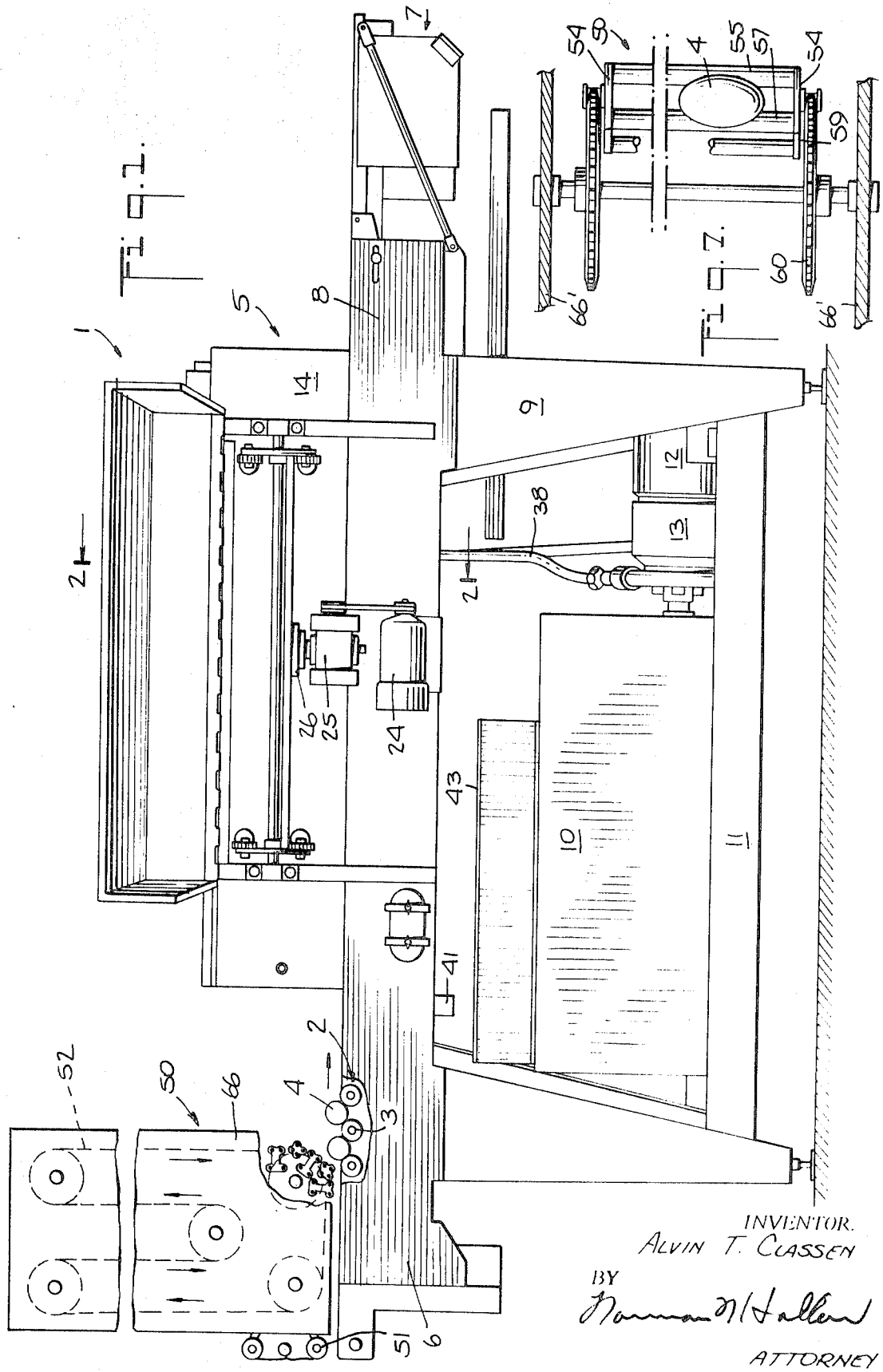
INVENTOR.
ALVIN T. CLASSEN
BY
Norman M Hallen
ATTORNEY

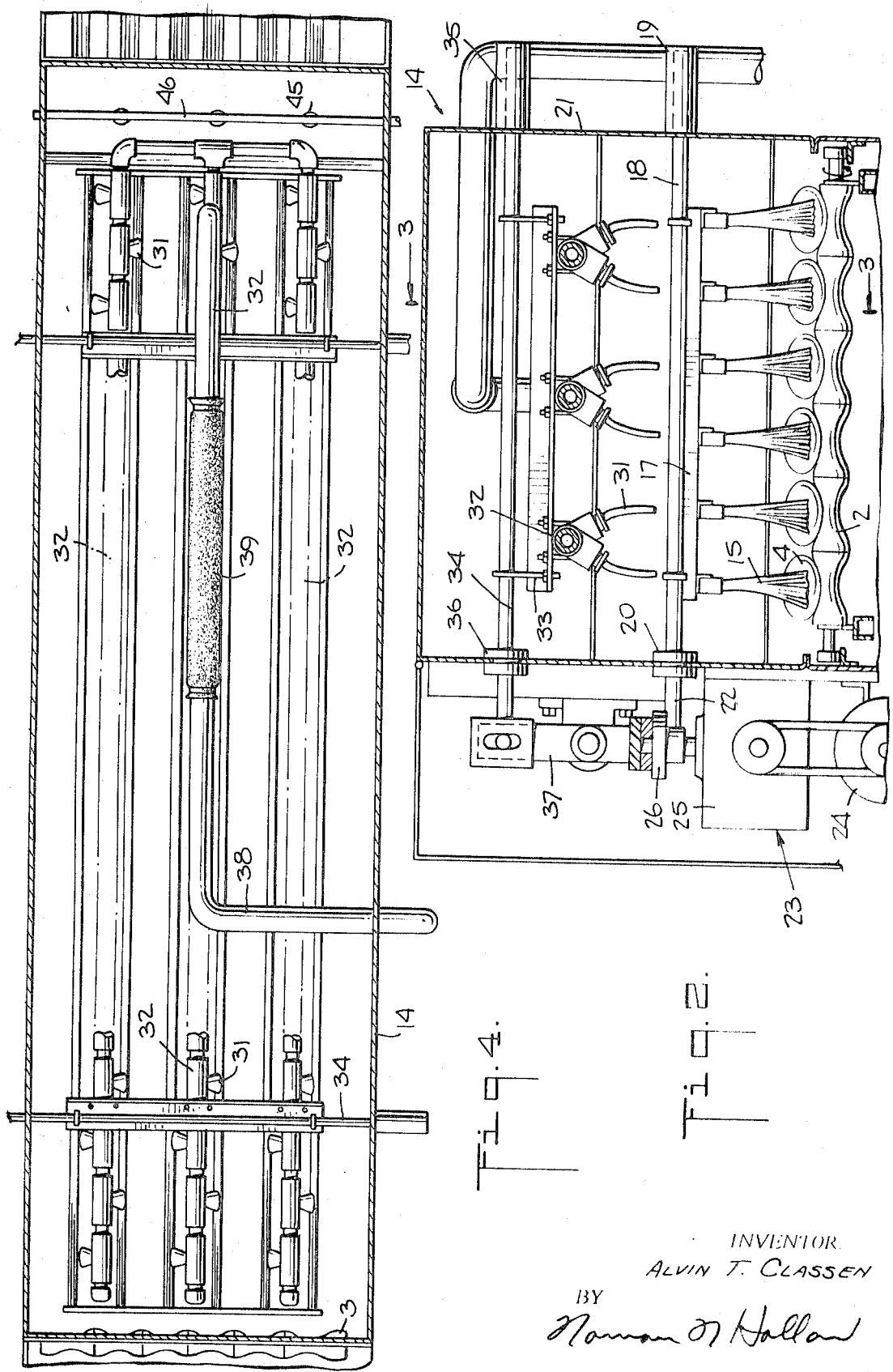

Nov. 23, 1971 A. T. CLASSEN 3,621,503
APPARATUS FOR WASHING EGGS
Filed Sept. 12, 1969 5 Sheets-Sheet 3
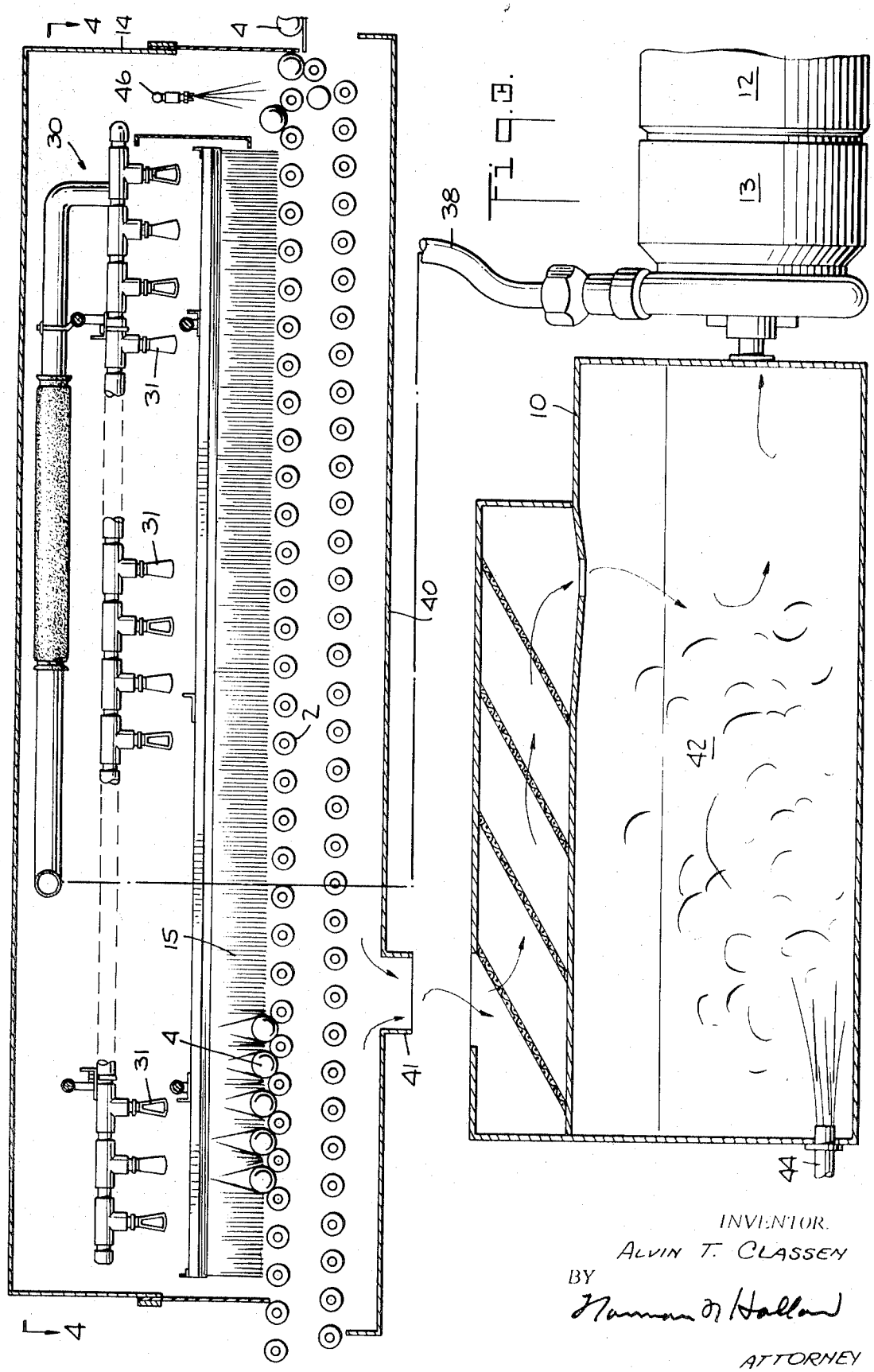
INVENTOR.
ALVIN T. CLASSEN
BY
ATTORNEY

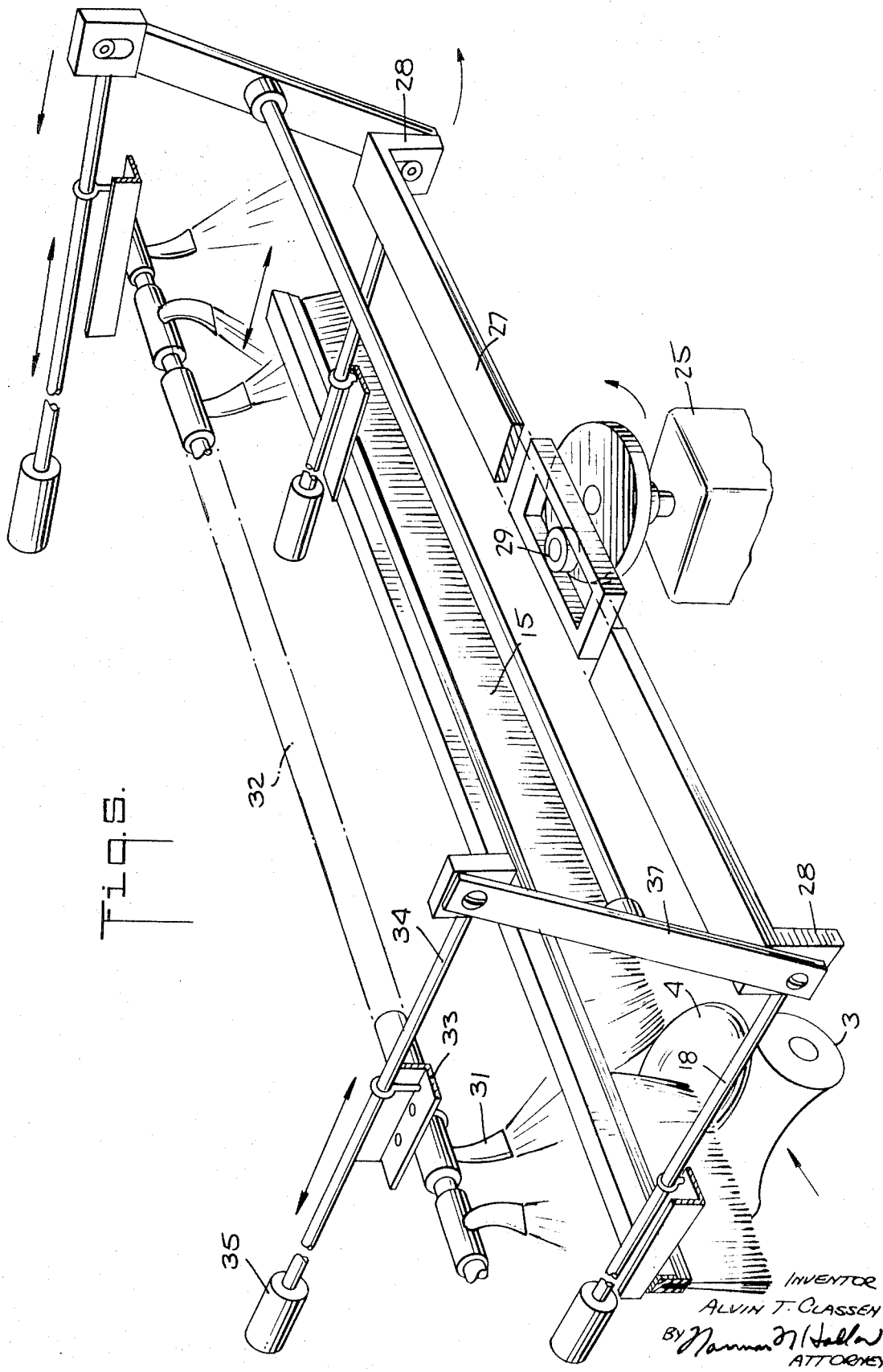

Nov. 23, 1971   A. T. CLASSEN   3,621,503
APPARATUS FOR WASHING EGGS
Filed Sept. 12, 1969   5 Sheets-Sheet 5

INVENTOR
ALVIN T. CLASSEN
By Norman M Hallow
ATTORNEY

United States Patent Office 3,621,503
Patented Nov. 23, 1971

3,621,503
APPARATUS FOR WASHING EGGS
Alvin T. Classen, Norfolk, Nebr., assignor to Henningsen
Foods, Inc., White Plains, N.Y.
Filed Sept. 12, 1969, Ser. No. 857,489
Int. Cl. A01k 43/00
U.S. Cl. 15—3.13                                 9 Claims

ABSTRACT OF THE DISCLOSURE

A compact machine for washing eggs prior to egg breaking or other egg processing or handling operations. One form of the machine has a roller-type conveyor mounted on a suitable frame carrying rows of eggs through a washing station. The washing station includes a series of elongated brushes, several of which are mounted in the direction of egg movement. The brush mounting means includes a drive for moving the brushes back and forth laterally across the conveyor in an egg brushing action. A series of nozzles are mounted above the brushes to spray the eggs during their forward movement and during the brushing operation. A drive means is provided to move the nozzles in the opposite direction from that of the brushes. A filtered supply of the washing solution is maintained in a tank positioned in the lower portion of the machine together with a suitable pump for providing the necessary fluid pressure for the spraying operation. A second form of the washer is used for particularly dirty eggs. It includes an additional washing chamber in the form of a tower in which the eggs are moved up and down several times on generally vertical paths during an additional spraying operation whereby an initial cleaning is obtained during an appreciable period which uses only a short horizontal distance on the machine conveyor.

BACKGROUND OF THE INVENTION

The present invention relates to automatic egg washing machines and more particularly to an improved and more effective egg washing machine which will handle both normally soiled eggs as well as eggs which previously had to be subjected to special washing operations as a result of their being covered with excessive amounts of dirt. Prior egg washing machines of this general type are known which utilize various arrangements of sprays and brushes. These prior arrangements, while suitable for certain standards of eggs, have not been universally useful including many supply situations where eggs, for one reason or another, are received in excessively soiled condition.

The egg washing machine in accordance with the present invention utilizes a novel combination of brush movement and spray nozzle arrangement and movement to assure a rapid cleaning of regular eggs and also includes an additional cooperating and related means for handling especially dirty eggs.

Accordingly, an object of the present invention is to provide a more efficient and more effective egg washing machine and method.

Another object of the present invention is to provide an improved egg washing machine having combined brush and nozzle drive movements which provide for more effective egg washing.

Another object of the present invention is to provide an egg washing machine including an added generally vertical washing tower which adapts the machine for handling especially dirty eggs without any prewashing operations.

Other and further objects of the invention will be obvious upon an understanding of the illustrative embodiment about to be described, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing, forming a part of the specification, wherein:

FIG. 1 is a side elevational view, partially cut away, illustrating a preferred embodiment of the egg washing machine in accordance with the present invention;

FIG. 2 is a vertical sectional view of the egg washer taken along line 2—2 on FIG. 1;

FIG. 3 is a vertical sectional view of the egg washing machine taken along line 3—3 on FIG. 2;

FIG. 4 is a horizontal sectional view taken along line 4—4 on FIG. 3;

FIG. 5 is a fragmentary perspective view of the brush and spray nozzle portion of the egg washing machine illustrating the drive means for the brushes and the nozzles;

FIG. 7 is a sectional view taken along line 7—7 on FIG. 6.

DESCRIPTION OF THE PREFERRED EMBODIMENT

Figure 6:
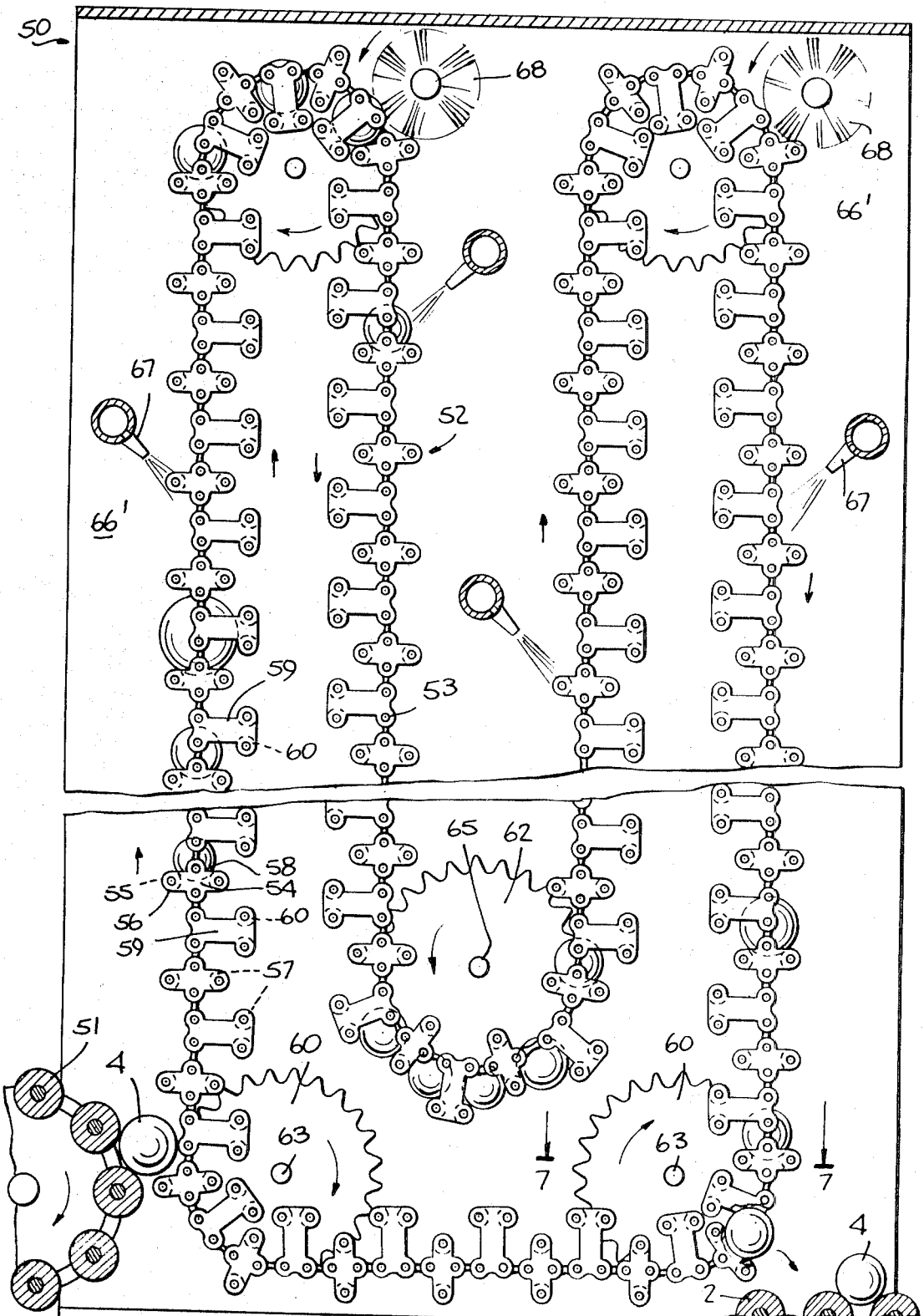
FIG. 6 is a side elevational view of the wash tower illustrating the rod and chain support means for the rows of eggs passing through the washing tower.

FIG. 1 shows the general arrangement of a preferred embodiment of the egg washing machine including an egg washing tower arrangement of the type used when the machine is for use with eggs received in particularly dirty condition. As will be indicated below, the washing tower portion of the machine may be incorporated in the conveyor or, under certain conditions, need not be included.

The egg washing machine 1 is seen to include a horizontally positioned roller-type conveyor 2. The rollers 3 of the conveyor 2 support lateral rows of eggs 4, as for example six eggs, and move them forward and through the egg washing station or head 5. The conveyor 2 is supported on suitable end pulleys which are coupled to and driven by the drive means of a related end synchronized egg breaking machine or by a suitable independent drive. Eggs are fed onto the entrance end 6 of the roller conveyor 2 by a regular egg feeding means such as a feed roller conveyor which itself may be loaded either automatically or by hand. The roller conveyor 2 is supported on a suitable frame 7 including an upper support frame 8 and spaced legs 9. The egg washing or sanitizing solution is conveniently stored in a tank 10 mounted on a lower shelf 11 and the solution is circulated through the spray system to be described below by a motor 12 and a pump 13.

The egg washing station 5 is positioned generally centrally of the conveyor and includes a washing cabinet or enclosure 14. The details of the washing head 5 including the mounting means for washing brushes 15 and spray nozzles 31 are illustrated in detail in FIGS. 2 thru 5.

The lowermost washing elements in the washing head 5 comprise the series of longitudinally positioned brushes 15 which in the particular embodiment illustrated comprise six brushes with one brush 15 being provided for each egg 4 in the rows of eggs being carried between the rollers 3 of the roller chain 2. These six brushes 15 are mounted for simultaneous movement on a mounting including two lateral mounting brackets 17 which are fixedly attached to two lateral drive rods 18. The drive rods 18 are slidably mounted in bearings 19 and 20 attached to the wash cabinet 14 side walls 21 as best illustrated in FIG. 2. A projecting end portion 22 of each of the two drive rods 18 is attached to a drive means 23 which reciprocates the drive rods 18 back and forth across the rows of moving eggs 4 causing each of the individual brushes 15 to move back and forth across the surfaces of the advancing eggs 4.

As illustrated in FIGS. 2 and 5, the drive means for the brushes 15 is seen to comprise a motor 24 coupled through a speed reduction device 25 to a crank 26 and a slotted drive bar 27. As seen in FIG. 5 the slotted drive bar 27 is coupled at its opposite ends 28 to the spaced drive rods 18 causing the rods 18 and attached brushes 15 to reciprocate back and forth at the rate of the crank 26 and by an amount determined by the position of the crank roller 29 on the crank 26. The stroke of the crank 26 and the brushes 15 is preferably arranged so that each brush 15 passes over an egg and slightly beyond the ends of the egg in both directions. For most egg washing operations, this distance can be set at about 3 inches which provides the necessary brush movement for normal eggs. The movement of a brush 15 past the egg ends is provided to permit the brush bristles to resume a vertical alignment at the end of each stroke preparatory to their bending in the opposite direction on the return movement of each brush 15.

A cooperating spraying means 30 is provided for the rows of eggs which comprises a number of spray nozzles 31. Preferably the nozzles 31 are arranged in rows with one nozzle 31 being provided for each egg in a row and with several rows of nozzles extending lengthwise of the cabinet 14. The preferred form for these nozzles comprises what is known as a cutting nozzle which is a nozzle having a thin elongated outlet to form a thin high pressure spray pattern to scour the egg 4 shells.

The individual spray nozzles 31 are seen in FIG. 4 to be attached to elongated pipes 32. The pipes 32 are attached by two lateral mounting brackets 33 to lateral support rods 34. These nozzle mounting rods 34 are supported on the sides 21 of the washing cabinet 14 in spaced bearings 35 and 36 best illustrated in FIG. 2. The nozzle support rods 34 are connected to the brush 15 drive system at the upper ends of two pivotally mounted rocker arms 37 as illustrated in FIG. 5. It will be seen that this arrangement provides for a synchronized movement of the nozzles 31 corresponding to the movement of the brushes 15 with the nozzles moving in the opposite direction to the movement of the brushes 15.

The nozzles 31 are fed from the washing solution tank 10 through the intermediation of the pump 13 and a supply conduit 38 which includes a flexible hose section 39 to permit the above described movement of the nozzles 31 and pipes 32.

The support frame 8 includes a drain pan 40 (FIG. 3) whose outlet 41 returns the washing solution 42 through filters 43 to tank 10. Heating means are provided for the washing or sanitizing such as the steam inlet 44.

A final rinse is provided by stationary spray nozzles 45 mounted on feed pipe 46 at the exit end of the cabinet 14.

A second embodiment of the egg washer in accordance with the present invention includes an additional washing element which is preferably positioned in advance of the above described washer head 5 and which is used in washing eggs which may include particularly dirty ones. FIG. 1 illustrates the additional washer 50 in position adjacent to the in-feed portion of the machine 1. As seen in FIG. 6 washer element 50 is designed to receive eggs 4 at its input from a regular roller-type conveyor 51 and feeds the pre-washed eggs 4 from its outlet onto a continuing conveyor such as conveyor 2. It is therefore clear that this additional washer 50 may be positioned as a separate element in the conveyor system or it may be incorporated directly into the washing machine 1 with roller conveyors to feed the eggs 4 in and out of it.

The details of this washer are illustrated in FIGS. 6 and 7. The tower washer 50 is seen to have four parallel vertical paths as the eggs 4 are alternately raised and lowered through a washing area on a conveyor 52. In the preferred form illustrated, a special type of roller or rod conveyor 52 is used to receive and transport the eggs 4. In this type of conveyor, two endless roller chains 52 mounted on spaced sprockets 60, 61 and 62 and modified by having specially shaped end links which mount egg supporting rods between them. These comprise a support link 54 which is symmetrical and which has one rod 55 attached on an outer projection 56 and one rod 57 positioned on an inner projection 58. Spaced between each of these end links 54 is a backup link 59 to which is attached two egg backup rods 60 which help to hold the eggs 4 in position on the support rods 55 and 57 during their upward and downward movement and which also act to contain the eggs 4 as the eggs pass around the central portion of the conveyor path at the central sprockets 62. As seen at the left hand side of FIG. 6, eggs 4 are dropped onto support rods 55 and 57 by a regular roller chain conveyor 51. The rod conveyor is continuously driven by a suitable drive coupled to any one or more of its sprocket mounting shafts 63, 64 or 65. A suitable metallic or other enclosure 66 surrounds the chains including side walls 66' which mount the sprocket support shafts 63, 64 and 65. The enclosure 66 also mounts a plurality of spray nozzles 67, as shown, which direct a relatively high pressure spray against the eggs 4 or of the rods as they move up and down the conveyor 52 path. Rotating brushes 68 are illustrated adjacent to the conveyor path which may be coupled to the sprocket drive or otherwise rotated to assist in the cleansing operation. The support and backup rods 55, 57 and 60 are proportioned as illustrated in FIG. 6 to lightly grip each row of eggs 4 as the eggs 5 are in their downward position as they move around the central support sprocket 62 and onto the next vertical run of the conveyor 52. The eggs 4 are removed from the conveyor 52 as shown at the right side of FIG. 6 where the open position of the rods 55, 57 and 60 permits the eggs 4 to roll out downwardly onto the take-out roller chain conveyor 2 which may be the regular conveyor of the above described washing machine.

OPERATION

Where normal eggs 4 are being washed which do not require the additional cleansing action of the tower section 50 as described above, the eggs 4 are fed in rows by a regular row feeder into the entrance end 6 of the washing machine 1. These rows of eggs 4 are now carried into the washing head 5 and are subjected to the simultaneous cleansing action of the moving brushes 15 and the moving spray nozzles 31. This cleansing action is best illustrated in FIG. 2 where it is seen that the brushes 15 oscillate back and forth along the rows of eggs 4 a sufficient distance to completely clear both ends of the eggs at opposite ends of the brushing stroke.

As seen in the view of the brushes 15 in the right and left hand sides of FIG. 2, the brushes 15 are moved far enough to assume the unflexed position illustrated and to thus be ready for the return brushing stroke. As described above, it is seen that movement of the brushes 15 in one direction is accompanied by a simultaneous movement of the nozzles 31 in the opposite direction. This accomplishes the result of causing the washing sprays to directly strike the egg surfaces to obtain a maximum spray cleaning effect directly from the nozzle spray and at the same time to facilitate the brushing action of the oppositely moving brushes 15. As the eggs 4 leave the washing cabinet 5, as seen at the left hand side of FIG. 3, they are subjected to a final spray by fixed lateral spray arrangement including a plurality of nozzles 45 fixedly mounted and directed onto the eggs 4 which are leaving the washing cabinet or head 5.

Where a more complete cleansing operation is desired to provide for an automatic washing of all eggs including the dirtiest eggs, the additional washing element 50 comprising the above described tower is used. In this embodiment, the eggs 4 are first rolled onto the support rods 55, 57 of the vertically oriented chains which carry these rows of eggs 4 on an elongated cleansing path formed by the four upward and downward moving runs of the tower rod conveyor 52. Here the eggs 4 are subjected to additional spray washing action which both removes the dirt and which begins a dirt softening action to facilitate cleansing in the above described washing apparatus. Additionally, for certain applications, a brushing action by brushes 68 is also incorporated in this portion of the process and of the machine. The pre-washed eggs pass from the tower washer 50 onto the infeed side of the above described level egg washing apparatus 1.

It will be seen that an improved egg washing machine has been provided which through the use of improved brushing and spraying means provides for a more efficient and completely automatic egg washing operation. These results are obtained through the novel drive means used to move both the egg brushing and the egg spraying means. Additionally, in an alternate embodiment the machine is seen to include an effective pre-washer which cooperates with the regular egg washing action to permit the automatic washing of the dirtiest eggs which would be found in all types of egg collecting operations. This embodiment cooperates with the level egg washer in such a manner that it may be employed or removed when necessary and so that it may be incorporated with the level egg washing action with little or no change in the level egg washing apparatus or process.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An egg washing machine comprising the combination of a support conveyor including means for carrying laterally aligned rows of eggs through the machine, a support for said conveyor, an egg washing station comprising a plurality of elongated brushes, said brushes being mounted above the conveyor in laterally spaced rows with each brush extending longitudinally of the conveyor for engaging eggs thereon, and a plurality of spray nozzles positioned adjacent to said brushes and above the conveyor in laterally spaced rows, and means for moving the brushes back and forth laterally of the conveyor for scrubbing the eggs thereon.

2. The machine as claimed in claim 1 which further comprises means for moving the spray nozzles back-and-forth laterally of the conveyor in opposite directions to the moving brushes.

3. The machine as claimed in claim 1 in which said means for carrying rows of eggs each accommodate an equal number of eggs, and in which the number of brushes equal said number.

4. The machine as claimed in claim 1 in which the nozzles are arranged in a plurality of lateral rows with the number of nozzles in a row equalling said number of brushes.

5. The machine as claimed in claim 1 in which said brush moving means comprises means for moving the brushes a distance which exceeds the length of the eggs being washed and for moving each of the brushes beyond the opposite ends of an egg.

6. The machine as claimed in claim 2 in which said means for moving said brushes comprises a pivotally mounted rocker arm and said brushes being coupled thereto on one side of said pivot and said nozzles being coupled thereto on the opposite side of said pivot.

7. The machine as claimed in claim 1 which further comprises a second support conveyor for rows of eggs, said second conveyor comprising spaced end chains and elongated rods connecting said chains, pairs of said rods being positioned for supporting rows of eggs, said chains being mounted on vertically spaced sprockets whereby said chains have vertical runs for moving the rows of eggs up and down along a path having substantially vertical portions, and egg washing means positioned along said path.

8. The machine as claimed in claim 7 in which said egg washing means comprises a plurality of spaced spray nozzles.

9. The machine as claimed in claim 7 in which said egg washing means comprises spray nozzles and egg scrubbing brushes.

References Cited

UNITED STATES PATENTS

| | | | |
|---|---|---|---|
| 2,979,746 | 4/1961 | Willsey | 15—3.13 |
| 3,097,382 | 7/1963 | Angle | 15—3.13 |
| 3,349,419 | 10/1967 | Kuhl et al. | 15—3.13 |
| 3,392,414 | 7/1968 | Cathcart | 15—3.13 |
| 3,505,698 | 4/1970 | Der Schoot | 15—3.13 |

EDWARD L. ROBERTS, Primary Examiner